(12) United States Patent  (10) Patent No.: US 8,491,830 B2
Chait  (45) Date of Patent: Jul. 23, 2013

(54) BOUNDARY CONFIGURATIONS FOR MULTI-MATERIAL PRINT-FORMING

(75) Inventor: Arthur L. Chait, Menlo Park, CA (US)

(73) Assignee: Eoplex Limited (CN)

( * ) Notice: Subject to any disclaimer, the term of this patent is extended or adjusted under 35 U.S.C. 154(b) by 1353 days.

(21) Appl. No.: 12/218,353

(22) Filed: Jul. 11, 2008

(65) Prior Publication Data

US 2010/0009133 A1   Jan. 14, 2010

(51) Int. Cl.
*B29C 41/02* (2006.01)

(52) U.S. Cl.
USPC .......................................................... 264/308

(58) Field of Classification Search
USPC .......................................................... 264/308
See application file for complete search history.

(56) References Cited

U.S. PATENT DOCUMENTS

| | | |
|---|---|---|
| 3,656,634 A | 4/1972 | Pearne |
| 3,763,776 A | 10/1973 | Jaffa |
| 3,861,955 A | 1/1975 | Lemelson |
| 4,068,766 A | 1/1978 | Schmitt |
| 4,466,994 A | 8/1984 | Hubbard |
| 4,824,306 A | 4/1989 | Stevenson |
| 5,157,438 A | 10/1992 | Beale |
| 5,260,009 A | 11/1993 | Penn |
| 5,286,573 A | 2/1994 | Prinz |
| 5,348,693 A | 9/1994 | Taylor |
| 5,354,414 A | 10/1994 | Feygin |
| 5,398,193 A | 3/1995 | deAngelis |
| 5,540,545 A | 7/1996 | Roberts |
| 5,574,957 A | 11/1996 | Barnard |
| 6,247,986 B1 | 6/2001 | Chiu |
| 6,855,371 B2 | 2/2005 | Gier |
| 6,960,882 B2 | 11/2005 | Kobayashi |
| 7,255,551 B2 | 8/2007 | Taylor |

FOREIGN PATENT DOCUMENTS

WO  WO 2007/039450  4/2007

*Primary Examiner* — Leo B Tentoni
(74) *Attorney, Agent, or Firm* — Heisler & Associates

(57) ABSTRACT

A print-forming method is disclosed which provides a method to engineer and design boundaries between the materials used in devices. The boundary includes primarily a first material on one side and primarily a second material on the other side. At least some of the second material is located on the first material side of the boundary and at least some of the first material is located on the second material side of the boundary in a precise pattern that achieve the objectives of the design. This approach is then extended to 3-dimensional shapes with any number of materials. Material properties that differ from each other thus do not exhibit an abrupt transition within the overall structure, but rather are accommodated within the boundary region. Various different exemplary boundary region configurations are disclosed, as well as techniques for optimizing this print-forming manufacturing within boundary regions.

16 Claims, 8 Drawing Sheets

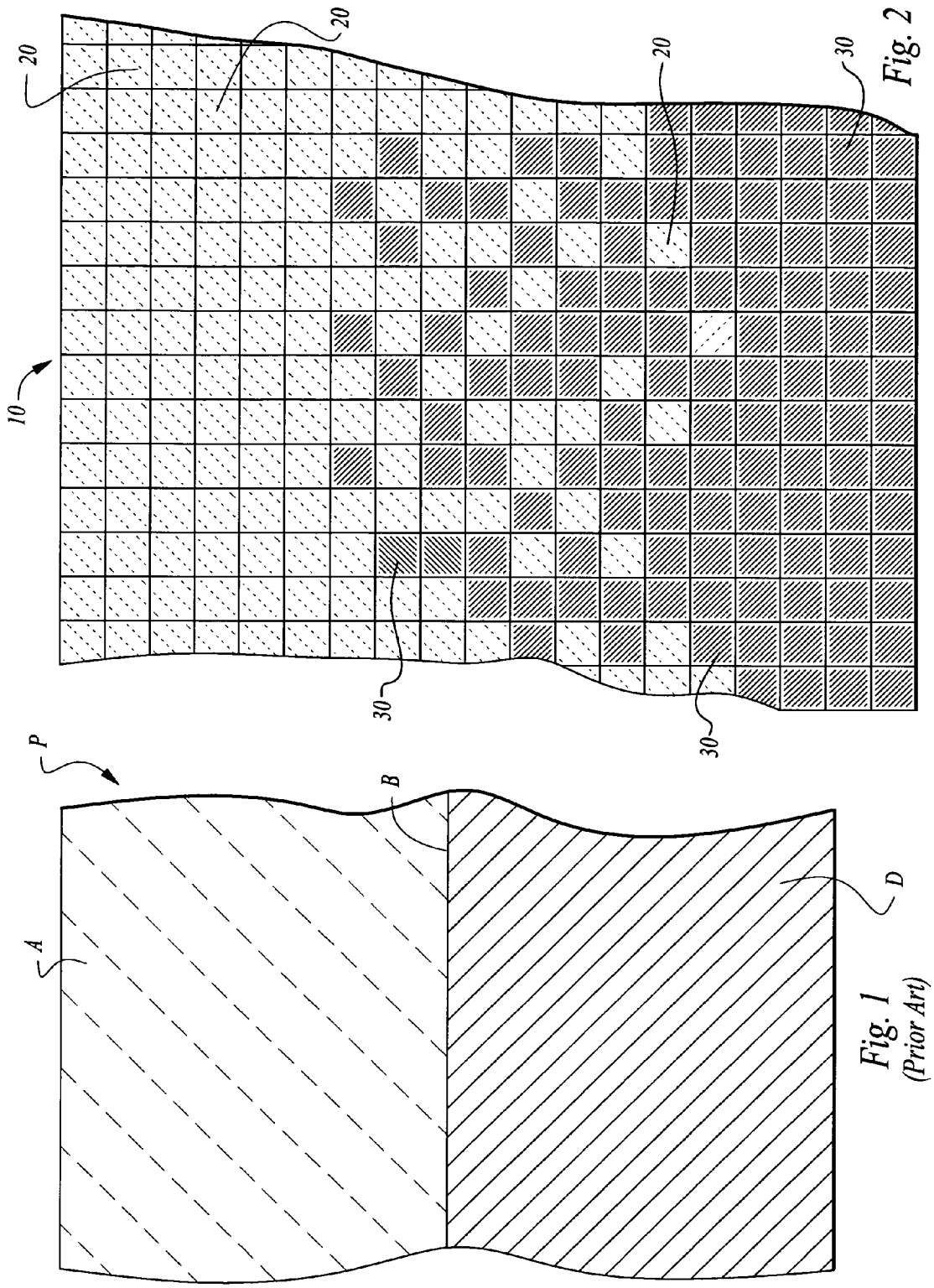

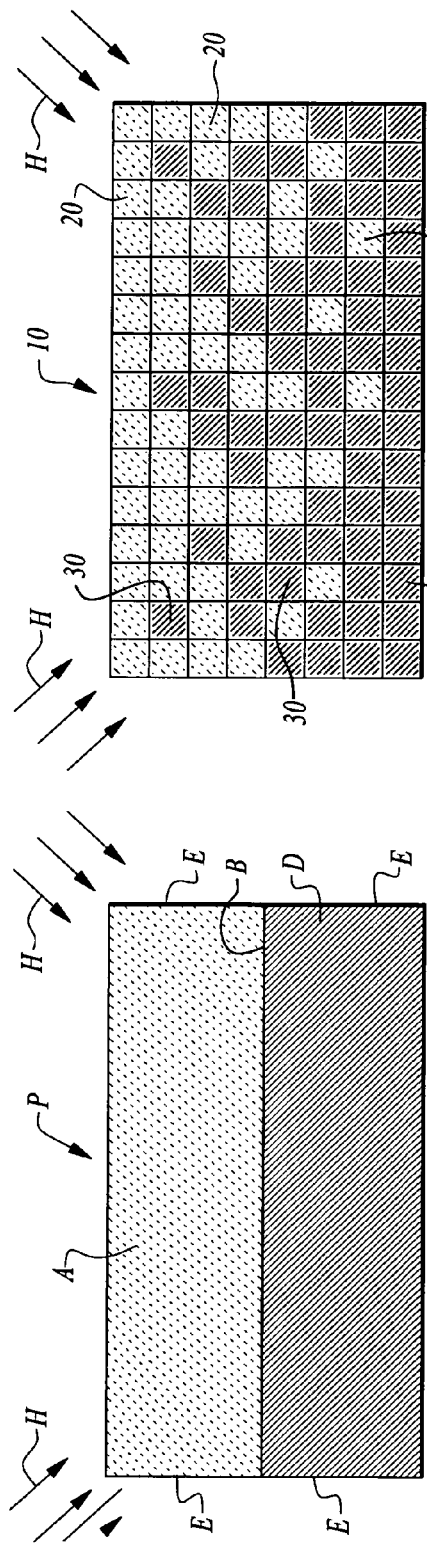
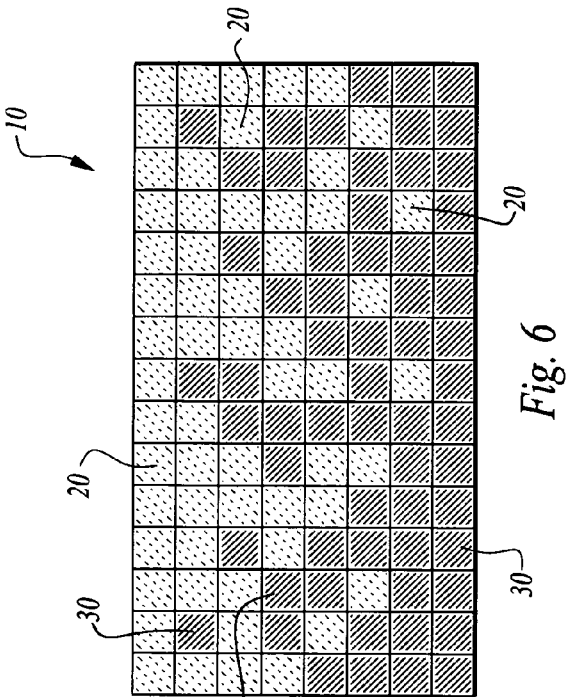
Fig. 3 (Prior Art)
Fig. 4 (Prior Art)
Fig. 5
Fig. 6

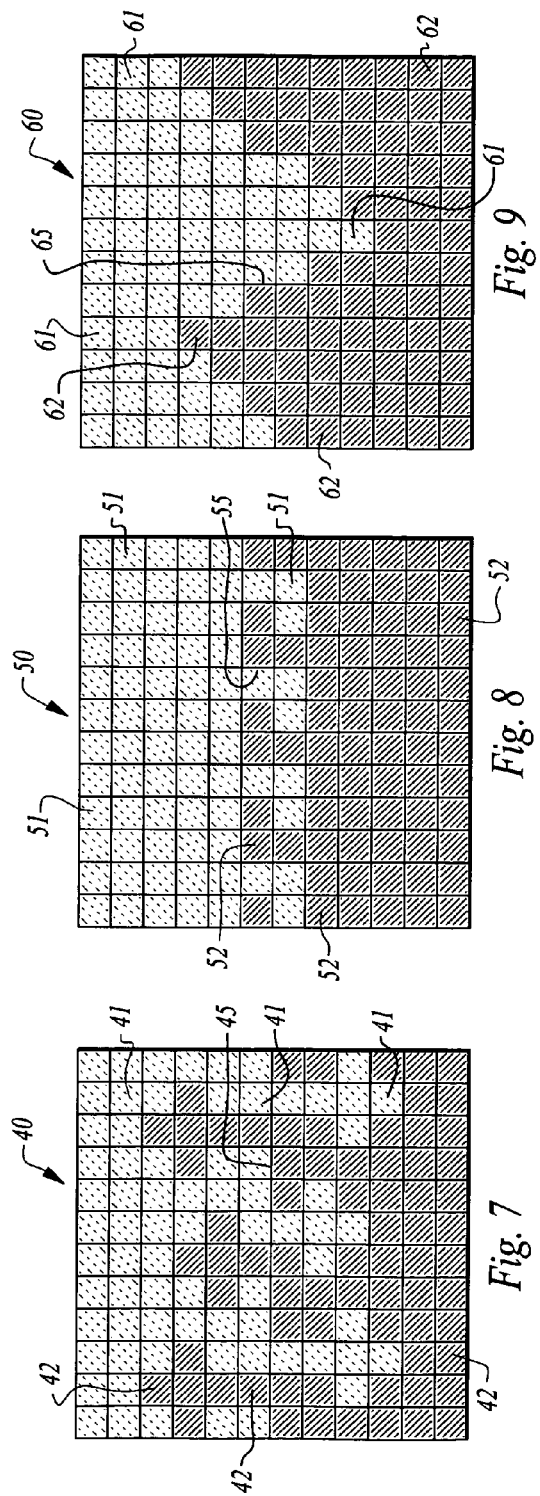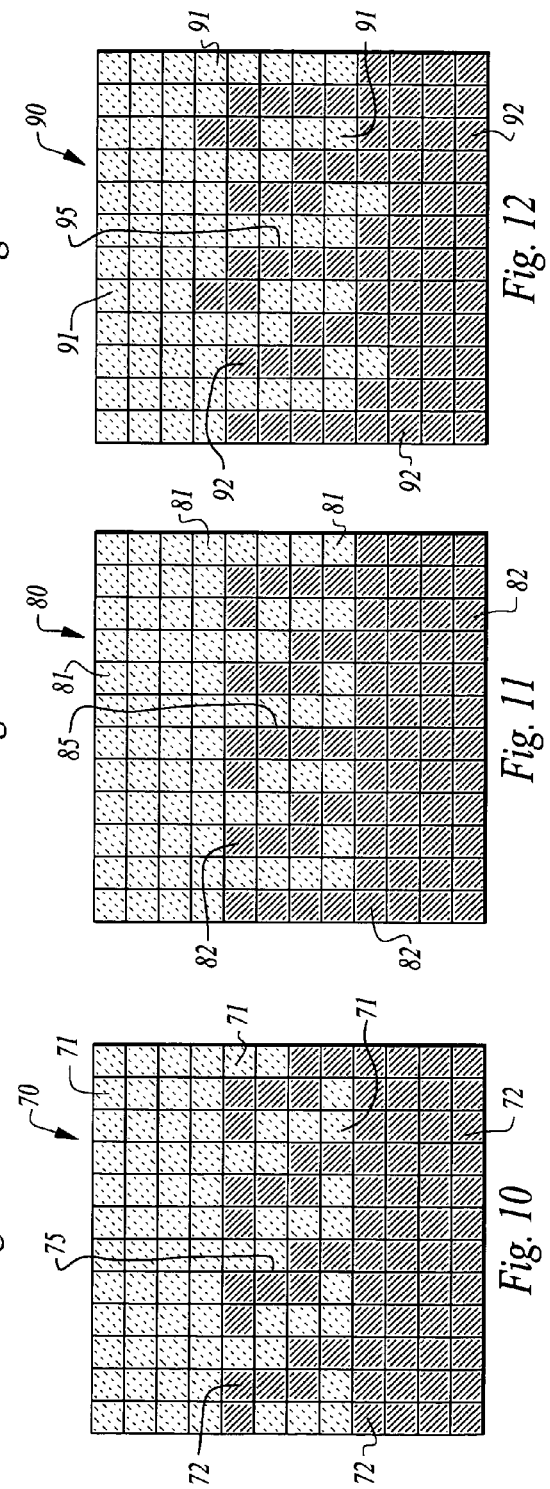

BOUNDARY CONFIGURATIONS FOR MULTI-MATERIAL PRINT-FORMING

CROSS-REFERENCE TO RELATED APPLICATIONS

This application incorporates by reference U.S. Pat. No. 5,348,693 and U.S. Pat. No. 7,255,551 in their entirety.

FIELD OF THE INVENTION

The following invention relates to structures which are formed by printing of layers of the material from which the structure is to be formed in successive layers, with typically multiple similar parts being manufactured simultaneously. More particularly, this invention relates to structures which include two or more dissimilar materials and methods for configuring boundaries between the dissimilar materials to minimize detrimental effects associated with interaction of the dissimilar materials with each other and a surrounding environment at the boundary.

BACKGROUND OF THE INVENTION

A manufacturing technology pioneered by the applicant is known in the prior art by the term "print-forming." Examples of this prior art technology are described in U.S. Pat. Nos. 5,348,693 and 7,255,551, incorporated herein by reference in their entirety. The print-forming method is derived from printing technology and uses proprietary "inks" to build multi-material complex parts. One company which has perfected such manufacturing technology is Eoplex Technologies, Inc. of Redwood City, Calif., which describes its manufacturing technology under the trademark "HVPF." Parts are designed in layers like rapid prototyping, but HVPF™ is a true manufacturing process that allows metals, ceramics, polymers and void spaces to all be designed into the part and thousands of parts to be made at the same time. Parts can contain hundreds of layers with thickness that ranges from microns to millimeters. The number of layers utilized with print-forming is determined by the resolution required by the part. For example some parts made by Eoplex have required over 300 layers and 5 different materials to achieve the proper resolution and function.

Structures that contain different materials can be manufactured in a variety of ways, with various advantages and disadvantages to the manufacturing methods. The simplest method would be to mix the materials into a homogeneous mixture and then form a part using casting, pressing or other forming methods. Concrete is a very basic example of this approach. The mixture in concrete typically consists of Portland cement, sand, gravel and water. The finished parts will be a conglomerate of the sand and gravel held together by the hydrated cement. Such a random amalgamation will typically have physical characteristics that are uniform throughout. However, such homogeneous structures are suitable only for the most basic technology and cannot produce the sophisticated results required in many applications. For example, in the semiconductor industry the manufacture of microchips requires precise placement of silicon, oxides, and doping materials to achieve the required design. This same type of requirement is also needed where semiconductor process cannot be used such as parts that contain different materials including conductors, ceramics, glasses, polymers and dielectrics and where complexity is high. Many processes address some of the requirements in this area but none are able to cover all the requirements and some devices remain either impossible to mass produce, cost prohibitive or both. Examples of the types of processes used include; MEMs, micro-assembly, LIGA, injection molding, embossing, micro-machining and others. Some of these methods work well with one material and a few methods can be modified, at high cost, to handle two materials. However, there are very few technologies that can handle several different materials simultaneously, with complex geometries, in small parts.

A second way to manufacture structures with multiple materials is to place the different materials into separate locations within the structure. For example fiber reinforced structures like graphite golf clubs and fiberglass fishing rods are actually layers of fiber bonded in a polymer matrix. In these composites the key to success is the strength of the bonding between the fibers and the polymers. Failures in these products are typically seen as delamination at this critical juncture such a union of dissimilar materials into separate micro-regions of a structure can be desirable in many applications however, in other applications the need is for a more integrated design of the dissimilar materials and a stronger bond between them.

At least one example where the interface and bond strength between dissimilar materials is critical is when the structure is to undergo repeated stresses which are handled differently by the dissimilar materials. For instance, and as depicted in FIGS. 1, 3 and 4, the prior art structure P might be provided with a first material having a low coefficient of thermal expansion A confined to a portion of the structure P above a boundary B, with a high coefficient of thermal expansion material D confined to a portion of the structure P below the boundary B. When heat H is applied to the structure P (FIG. 3) the material A responds differently than the material D.

In particular, and as depicted in FIG. 4, the material A does not expand as much as the material D. While the materials A, D are joined together at the boundary B, and thus have a tendency to restrain expansion under the thermal stress associated with application of the heat H, these stresses can exceed limits of the materials, resulting in undesirable warping and/or the formation of cracks C. In severe cases the materials can even split apart at the junction. Note from FIGS. 3 and 4 that the ends E remain adjacent each other before the heat H is applied. After the heat H is applied, the ends E have spread differing distances resulting from the different coefficients of thermal expansion, thus causing both the forces tending to warp the structure P and formation of cracks C, particularly along the boundary B.

Concentration of thermal stresses along a boundary is only one problem associated with bonding and joining and building structures with dissimilar materials. As another example, differing materials usually have a significantly different modulus of elasticity so that they exhibit a greater or lesser degree of flexibility when placed under tension, compression or torsion loads, resulting in a similar concentration of stresses along the boundary as that depicted in FIGS. 3 and 4. As other examples, the dissimilar materials might have differing transition temperatures at which strength of the materials is diminished, such that the final structure exhibits non-uniform strength characteristics and associated stress concentrations, when transition temperatures have been exceeded for one material and not the other. Other dissimilar stress characteristics between materials could also be experienced which tend to concentrate stresses along a boundary and otherwise cause the material to delaminate along the boundary or crack along the boundary or otherwise exhibit degraded performance along the boundary in an undesirable fashion.

Furthermore, the materials might be of a type which do not readily bond together or for which there is not a suitable intermediate phase to create bonding. A strong bond at the interface layer is critical since this is the place where stress is concentrated under load and where failure will first occur. If the materials cannot be bonded properly they may not be able to be used together.

Accordingly, a need exists for a technique for forming continuous structures from dissimilar materials in a manner which avoids concentration of stresses, and resulting cracking, warping or other undesirable performance along the boundaries between dissimilar materials.

SUMMARY OF THE INVENTION

With this invention structures are described along with a method for forming such structures which allow for designed transition from one material to another in such as way that creates boundary configurations which resist common failure modes. In particular, the structures are print-formed in layers for at least a portion of the structure including at least a portion of a boundary between at least two different materials.

Rather than having the boundary define a transition from entirely the first material to entirely the second material as the boundary is crossed, at least a portion of both materials are deposited on both sides of the boundary in a pattern specifically designed to optimize performance. In the prior art, only homogeneously mixed structures or structures with entirely a first material on one side of the boundary and entirely a second material on the other side of the boundary were possible. With this method, the boundary is to some extent converted from a surface-like character to a volumetric region including portions of the structure on either side of a midpoint between the primarily first material region and the primarily second material region, so that an engineered boundary region and transition zone exists.

This boundary region can be designed in any manner necessary by depositing a pattern of the two or more materials that has been determined to minimize stresses, maximize bond strength or provide many other advantages. A simplified version of this would be a uniform transition zone of both materials as they approach the boundary with one material increasing in concentration as the other decreased and then reversing the concentration as the boundary was passed. In this manner a boundary can be produced where the materials are strategically placed in a structured format to provide the boundary with interlocking characteristics. Alternatively, the materials can be strategically placed to minimize crack propagation, enhance strength characteristics or other material characteristics, or merely be provided in a random pattern within this boundary region. In this manner, stresses do not concentrate within a single plane or curving surface along the boundary. Rather, only very small stresses are experienced and they are dispersed over the volume of the boundary region, so that stresses do not accumulate to a sufficient degree to cause degradation of performance of the structure.

To implement the formation of such a structure, print-forming techniques can be utilized. In print-forming a structure is built up of layers of printed materials that will later transform into the metals, ceramics, polymers or other final materials needed. The layered construction is similar to the scan layers that are created by a CAT scan or MRI in the medical field. Parts a divided into layers in the computer model and images of the scan are used to define the printing methods that are needed to deposit each material into each layer.

In a simple example where the boundaries are generally parallel with layers of the structure being formed by print-forming, the structure is formed by "printing" of layers of material successively upon each other to form the resulting structure. Initially, layers of primarily only the first material are provided. As the boundary approaches, layers are "printed" which include primarily a first material but at least some second material. A percentage of second material can increase with each successive layer until the middle of the boundary region is reached. On the second material side of the boundary, the first material is initially provided in a relatively high percentage. As successive layers on the second side of the boundary are "printed" a lesser and lesser amount of the first material is included. Finally, layers of substantially only the second material are "printed."

The resulting structure has regions of substantially only the first material and substantially only the second material, but with a boundary region, instead of a sharp boundary plane and where the region is not planar in form, but rather is a region having a defined thickness which exhibits intermediate characteristics between those of a structure formed purely of the first material or purely of the second material.

These examples describe the invention in terms of only two materials and in planar dimensions. However, the full invention includes utilizing the same approach with many different materials in full 3-dimensional boundary interfaces.

Typically, each layer would be to some extent "digitized" into multiple separate volumetric pixels or voxels. These voxels can be though of as building blocks, or "micro-bricks" of material with each micro-brick being formed substantially from a single formulation. When designing the structure, micro-bricks of different materials or material formulations are placed in patterns according to what property is being optimized or what stress is being overcome or any other goal. The designer is thus able to design the structure at a microscopic level and with a particular pattern dictated by the performance desired for the structure being designed. The designer would select whether to utilize a random distribution of differing materials, a concentration of different materials, or some form of interlocking pattern of differing materials for construction of all boundaries in the structure.

Once this design has been complete the different patterns required for building the design and for all transition layers are transferred to the print forming equipment. This can be by means of ink-jet programming or by creating printing masks, screens, stencils, offset rolls, gravure plates, lithography masks or any other printing techniques or processes that can reproduce the micro-brick patterns. Typically, when dissimilar materials are utilized within a common structure, each layer is formed in multiple steps where a step is used to print-form each material that goes into the same layer. In order to accomplish this, these print materials must be formulated to be able to do all of the following at the same time:

1. Print at very high accuracy and resolution
2. Quickly achieve a temporary set to avoid distortion when the next material is printed along side on or top of the previous one. This is typically done by a cure step using heat, chemicals, air-drying or radiation of an appropriate type.
3. Achieve a strong bond between layers.
4. Decomposed to form the final ceramic, metal, or polymer materials when heat which also joins all the micro-bricks together to form the final structure.

OBJECTS OF THE INVENTION

Accordingly, a primary object of the present invention is to provide structures formed of multiple dissimilar materials and with engineered boundaries between the different materials, that optimize performance and/or avoid performance degradation.

Another object of the present invention is to provide a monolithic structure formed of dissimilar materials and which has a resistance to the formation of cracks along boundaries between dissimilar materials.

Another object of the present invention is to provide a structure formed of dissimilar materials which resists warping.

Another object of the present invention is to provide a structure of dissimilar materials which distributes stress over a large region between dissimilar materials, rather than concentrating stresses along a boundary.

Another object of the present invention is to provide a method for print-forming structures formed of dissimilar materials which minimizes concentration of stresses along a boundary.

Another object of the present invention is to provide a manufacturing method which gives a designer the ability to design boundary performance for the structure.

Other further objects of the present invention will become apparent from a careful reading of the included drawing figures, the claims and detailed description of the invention.

BRIEF DESCRIPTION OF THE DRAWINGS

FIG. 1 is a sectional view of a prior art structures formed of dissimilar materials, including a planar sharp boundary between regions of dissimilar materials.

FIG. 2 is a sectional view similar to that which is shown in FIG. 1 but for a structure formed according to this invention and with a random pattern of micro-bricks of dissimilar materials occupying a boundary region with a concentration micro-brick distribution within the boundary region.

FIG. 3 is a sectional view of that which is shown in FIG. 1, before heat is absorbed by the structure.

FIG. 4 is a sectional view similar to that which is shown in FIG. 3, but after heat has been absorbed by the structure.

FIG. 5 is a sectional view similar to that which is shown in FIG. 3 but for a structure such as that depicted in FIG. 2, before heat is absorbed by the structure.

FIG. 6 is a full sectional view similar to that which is shown in FIG. 5, but after expansion associated with application of heat thereto, and illustrating the relatively uniform expansion without a propensity for warping or crack propagation due to the unique boundary configuration of this invention.

FIGS. 7-12 are each sectional views of different print-formed structures with different boundary configurations of a designed form, rather than a random distribution.

DESCRIPTION OF THE PREFERRED EMBODIMENT

Figure 13:
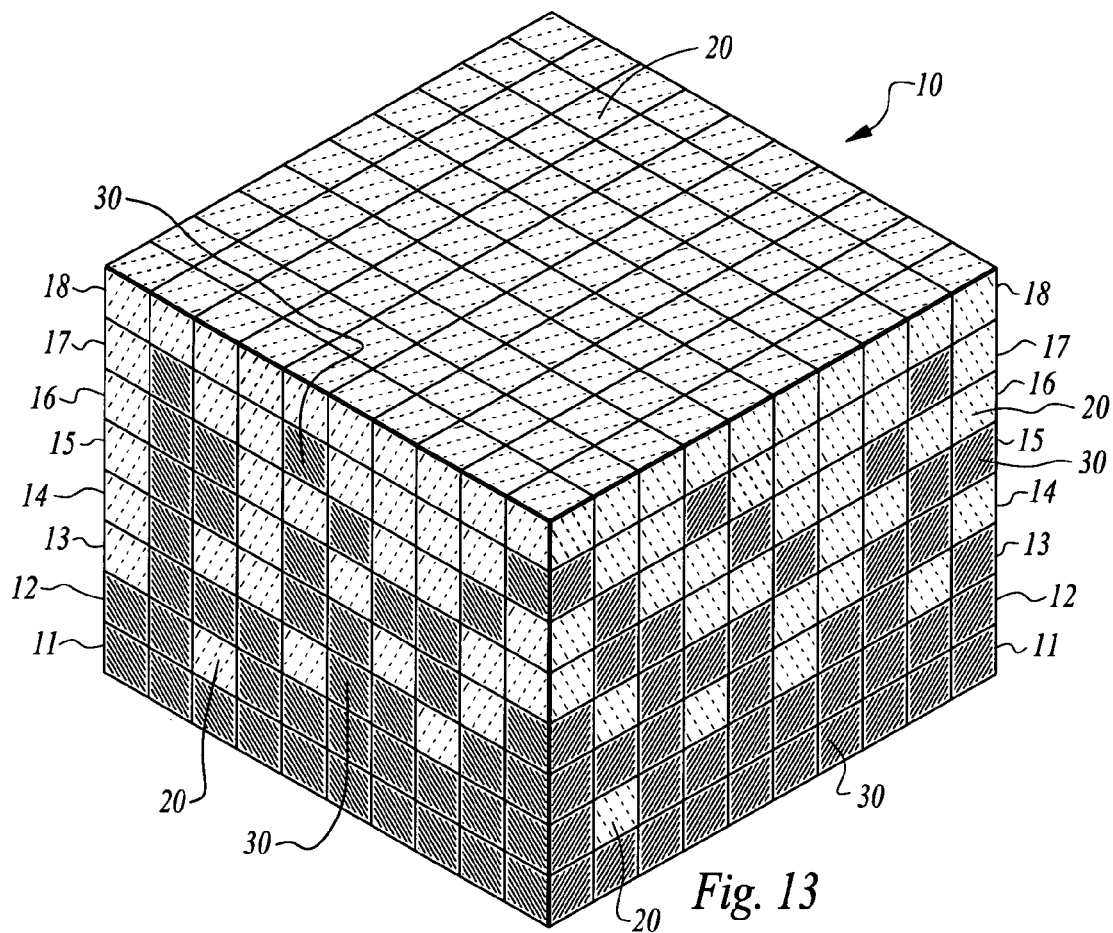
FIG. 13 is a perspective view of a portion of a print-formed structure similar to that which is shown in FIG. 2, but depicted in three dimensions illustrating the micro-bricks of dissimilar materials distributed in a boundary region for the structure.

Referring to the drawings, wherein like reference numerals represent like parts throughout the various drawing figures, reference numeral 10 is directed to a structure (FIG. 2) that is formed of two different materials. The two materials come together at a boundary region with one of the materials comprising first micro-bricks 20 and one of the materials comprising second micro-bricks 30. The first micro-bricks 20 and second micro-bricks 30 are largely confined to separate regions adjacent each other at the boundary region. Within the boundary region, various different transitional schemes are employed to gradually transition from substantially only the first material to substantially only the second material. In this way, dissimilarities in the performance of the materials do not result in concentration of stresses and otherwise sharp differences in material performance at the boundary. Rather, any such stresses are dispersed so that less overall stress and propensity to failure or other undesirable performance is exhibited by the structure 10.

The structure 10 is preferably print-formed by printing successive layers of the first material and/or second material in consecutive layers one upon the other until the entire structure 10 is formed. Details of such print-forming manufacturing technology are described in U.S. Pat. Nos. 5,348,693 and 7,255,551, incorporated herein by reference in their entirety. While such a print-formed structure could be formed with a decisive boundary surface by first print-forming a series of layers of the first material only and then after the boundary has been crossed printing successive layers of the second material only (as depicted in FIG. 1), with print-forming it becomes possible to provide a less sharp boundary region.

The term boundary can be specifically described as a surface having two sides with one side occupied primarily by a first material and the other side occupied primarily by a second material. Thus, the boundary becomes that surface in space where half or more of the material on one side is comprised of the first material and half or more of the material on the second side of the boundary is comprised of the second material. The boundary region is defined as a region where the structure 10 is not entirely formed of the first material or the second material, but rather includes some mixture of the two materials together. This boundary region can have a very small thickness or can have a very wide thickness, depending on the design characteristics selected by a designer of the structure 10.

When employing such design to form the structure 10, the first material and second material are confined to micro-bricks 20, 30. First micro-bricks 20 are provided which are formed substantially entirely of the first material only. Second micro-bricks 30 are provided which are formed substantially only of the second material. The drawings depict a simplest case where the multi-material print-formed structure 10 has two different materials. However, the structure 10 could have three or more different materials with micro-bricks formed of three or more different materials, as a mere extrapolation of the concept disclosed herein, and is still within the scope of this invention.

In FIGS. 2 and 5-12 the micro-bricks are depicted in two dimensions only. However, the micro-bricks would be three dimensional in nature, as depicted in FIGS. 13-23. In a simplest form of the invention the micro-bricks 20, 30 are square in cross-section and cubic in form. As an alternative, and as described below, the micro-bricks could have other shapes as well.

As depicted in FIGS. 3-6, the benefit of providing a boundary region, rather than a sharp surface boundary is described. In particular, when a multi-material structure is formed with a precise boundary B (FIGS. 3 and 4) differences in the characteristics of the two materials A, D above and below the boundary B can lead to stress concentrations and degradation of performance or failure along with boundary B.

In the example depicted in FIGS. 3 and 4, the first material A exhibits a lower coefficient of thermal expansion than a material D located below the boundary B. For instance, the first material A could be a form of ceramic, and the second material could be a metal, such as steel. While the prior art structure P has both sections above and below the boundary B having a similar width between side edges E initially, after heat H is applied (FIG. 4), the prior art structure P does not perform well. In particular, and as depicted in FIG. 4, the different coefficients of thermal expansion mean that material A expands less than material D. Bonding of the different materials along the boundary B might initially cause material A and material D to remain attached at the boundary B. In this case, the structure P will have a tendency to warp as depicted in FIG. 4. With too much application of heat H or successive cycling, bond strength across the boundary B is typically exceeded and cracks C form along the boundary B. Thereafter, the ends E of the differing materials will tend to expand a differing amount. Warping, disproportionate linear expansion and crack propagation are three examples of failure, or at least degraded performance, which can be beneficially mitigated by the method of this invention.

As depicted in FIGS. 5 and 6, rather than providing a precise boundary B (FIGS. 3 and 4) a boundary region is instead provided where the materials gradually transition from primarily (but not exclusively) the first material above the boundary region to primarily (but not exclusively) the second material at the bottom of the boundary region. In this example, first micro-bricks 20 are concentrated above the boundary region with a lesser and lesser amount of first micro-bricks 20 in successive layers moving down into the boundary region, until no first micro-bricks 20 are included at a lowermost portion of the structure 10 depicted in FIG. 5. Similarly, the second micro-bricks 30 are concentrated below the boundary region and are not found above the boundary region. Within the boundary region, a lesser and lesser percentage of second micro-bricks 30 are provided as portions of the boundary region further and further from the second material region are formed.

Such a concentration through the boundary region can be linear, such as with each layer having a proportionately lesser percentage of first brick 20 or second brick 30, or can be random or structured, depending on the desires of the designer. In any event, stress concentrations are avoided. Particularly, when heat H is applied (FIG. 5), the overall structure 20 will tend to enlarge a relatively uniform amount. Stresses will develop along edges of the first brick 20 and second micro-bricks 30 which are surrounded by micro-bricks 30, 20 of the other material. However, these stresses will be distributed throughout the boundary region rather than aligned precisely along a specific boundary surface, such as the boundary B (FIGS. 3 and 4). As a result, crack C propagation is controlled by the design such as that depicted in FIGS. 5 and 6. Also, warpage of the structure 10 is inhibited by this configuration. The structure 10 is depicted as larger in FIG. 6 than in FIG. 5, representing the expansion associated with an average of the coefficients of thermal expansion of the material forming the first micro-bricks 20 and the material forming the second micro-bricks 30 due to application of the heat H. In portions of the structure 10 defined by regions formed entirely of the first material or the second material, no doubt something other than a purely rectangular form depicted in FIG. 6 would be evident due to irregular expansion. Also, for some geometries, some warpage might still occur, but the warpage would be less than otherwise, within the boundary region, and crack mitigation is provided.

With reference to FIGS. 7-12, alternatives to a random distribution within the boundary region is described. In particular, a print-formed structure 40 is shown in FIG. 7 which exhibits a highly structured interlocking boundary 45 between first micro-bricks 41 and second micro-bricks 42. This interlocking boundary 45 takes on the form of alternating crosses of larger and smaller size. An interlocking boundary has the benefit of helping to hold together the materials within the first micro-bricks 41 and the second micro-bricks 42, even if they would not otherwise naturally adhere to each other. Also, a propensity for crack formation is mitigated and warpage and other detrimental effects associated with a planar boundary are avoided or reduced.

In FIG. 8 an additional print-formed structure 50 is depicted which also exhibits an interlocking boundary 55 between first micro-bricks 51 and second micro-bricks 52. With this structure 50, a more simplified interlocking L-shaped boundary 55 is provided with uniform L-shaped structures formed of first micro-bricks 51 and second micro-bricks 52.

In FIG. 9 an additional print-formed structure 60 is depicted formed of first micro-bricks 61 and second micro-bricks 62 on opposite sides of a boundary 65 which is not interlocking in nature. Rather, a different form of structured boundary is provided which exhibits a jagged repeating form. Such a form has a uniform concentration across a boundary region and avoids a planar configuration for the boundary 65. A designer might select such a boundary when the materials forming the first brick 61 and second brick 62 are capable of adhering to each other well, but exhibit differing properties, such as differing coefficients of thermal expansion, which could lead to crack propagation if a narrow boundary region or planar boundary were provided.

FIG. 10 depicts an additional print-formed structure 70. This print-formed structure 70 is formed of first micro-bricks 71 and second micro-bricks 72 which exhibit an interlocking boundary 75 depicting another pattern that might be selected by a designer.

FIG. 11 depicts a print-formed structure 80 formed of first micro-bricks 81 and second micro-bricks 82 which come together at an interlocking boundary 85 therebetween. The interlocking boundary 85 exhibits still another pattern for the boundary region and the interlocking boundary 85.

FIG. 12 depicts a print-formed structure 90 formed of first micro-bricks 91 and second micro-bricks 92 on opposite sides of an interlocking boundary 95. The structure 90 provides a further example of how a boundary region can be configured. With each of these boundary configurations depicted in FIGS. 7-12, as well as numerous other structured boundary configurations, a designer can place first micro-bricks and second micro-bricks precisely where desired to cause the structure to exhibit performance precisely as required by the designer. The boundary can for instance be chosen to be abrupt between the different materials or gradual between the different materials. The repeating pattern of blocks of high uniformity can be provided or a more random configuration can be provided. If a structure already exhibits regions where stress is being concentrated, the boundary can be configured in that region to mitigate such stresses.

Figure 14:
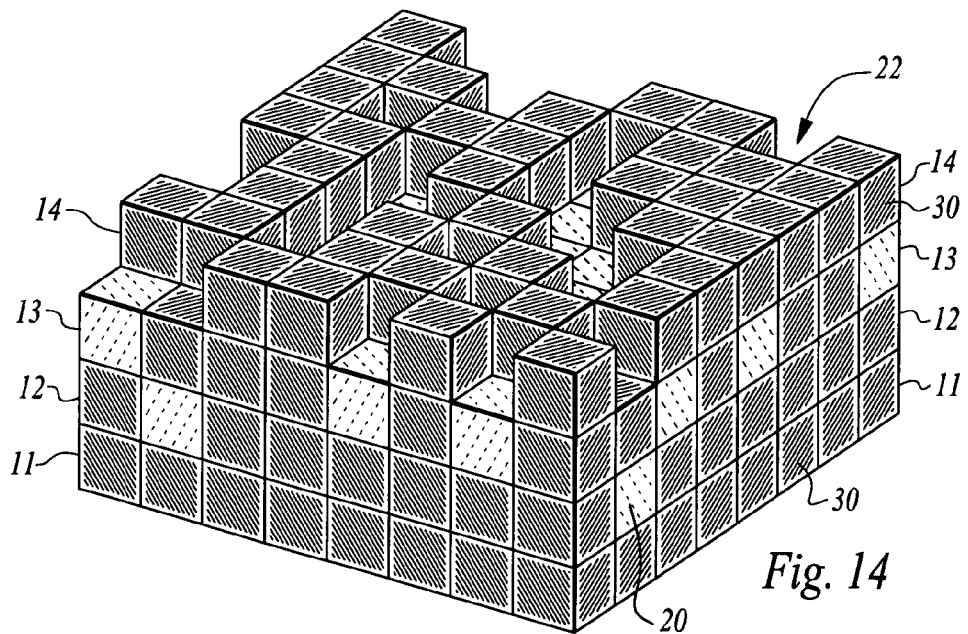
FIG. 14 is a perspective view showing a portion of that which is shown in FIG. 13 during a step in the manufacture of the structure of FIG. 13, and after formation of a fourth layer with a first material only.
Figure 15:
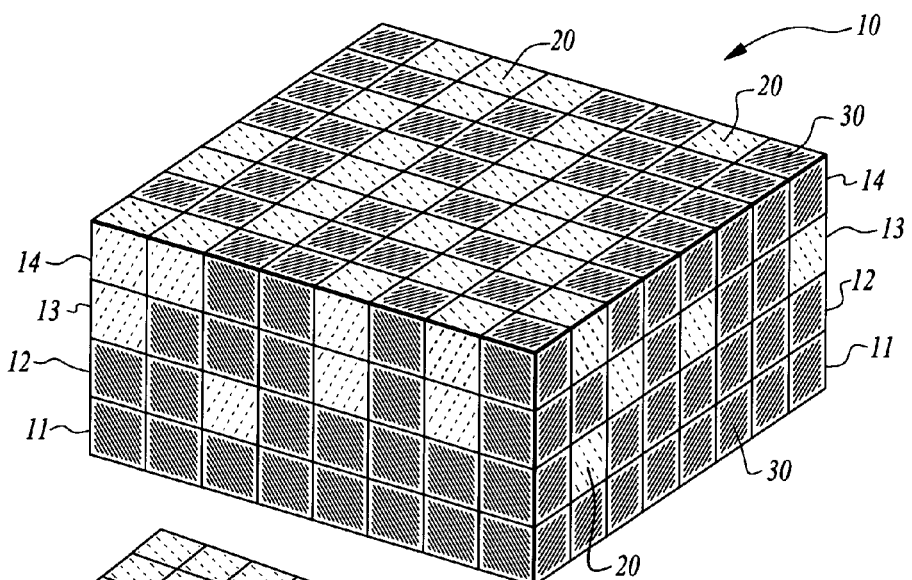
FIG. 15 is a perspective view similar to that which is shown in FIG. 14, but after further forming of the second material within the fourth layer to complete the fourth layer of the structure.

With particular reference to FIGS. 13-15, details of the print-formed structure 10 of the preferred embodiment are further described in a three dimensional setting. FIG. 13 illustrates a print-formed structure 10 which includes multiple different layers successively resting upon each other. A first layer 11 provides a foundation for formation of the structure 10. The second layer 12 rests upon the first layer 11. The successive layers 13, 14, 15, 16, 17 and 18 are printed one upon the other to form the entire print-formed structure 10.

In this embodiment depicted in FIG. 13, primarily only a boundary region is shown with the first layer 11 being entirely formed of the second micro-bricks 30 and the eighth layer 18 formed entirely of first micro-bricks 20. Thus, this boundary region is six layers thick with the boundary in the middle of these layers (between the fourth layer 14 and the fifth layer 15). Intermediate layers have progressively greater and greater number of first micro-bricks 20 as additional layers are added to this structure 10. This design particularly utilizes a random configuration where various different first micro-bricks 20 and second micro-bricks 30 are randomly distributed within the boundary region. However, they also exhibit a concentration with a lesser number of first micro-bricks 20 in lower layers and with a greater number of first micro-bricks 20 in upper layers. Correspondingly, a lesser number of second micro-bricks 30 are provided in higher layers and a greater number of second micro-bricks 30 are provided in lower layers. This concentration occurs in two dimensions as depicted in FIG. 13.

To provide such a print-formed structure as that depicted in FIG. 13, FIG. 14 is provided as an illustration. In FIG. 14 three layers including layers 11, 12 and 13 have been entirely formed. Also, the fourth layer 14 has had only the second micro-bricks 30 put in place. In particular, a printing machine has printed the material forming the second micro-bricks 30 of the fourth layer. 14 onto a combination of first micro-bricks 20 and second micro-bricks 30 within the third layer 18. After such printing of the second micro-bricks 30 of the fourth layer 14, if necessary this layer is cured to harden the second micro-bricks 30 within the fourth layer 14.

Voids 22 are present between the second micro-bricks 30 within the fourth layer 14. FIG. 15 depicts completion of the fourth layer by printing only the first micro-bricks 20 to cause material forming the first micro-bricks 20 to be placed into the voids 22 of FIG. 14. The fill procedure could be by printing or some other technique to merely fill the voids 22. If necessary, some form of curing step can be provided to cure the second brick 20 and/or the entire structure. The fourth layer 14 is now complete and now the fifth layer 15 can then be printed onto the fourth layer 14. It can thus be seen that through utilizing the manufacturing technique of print-forming, the customized boundary configuration of this invention is particularly facilitated.

Figure 16:
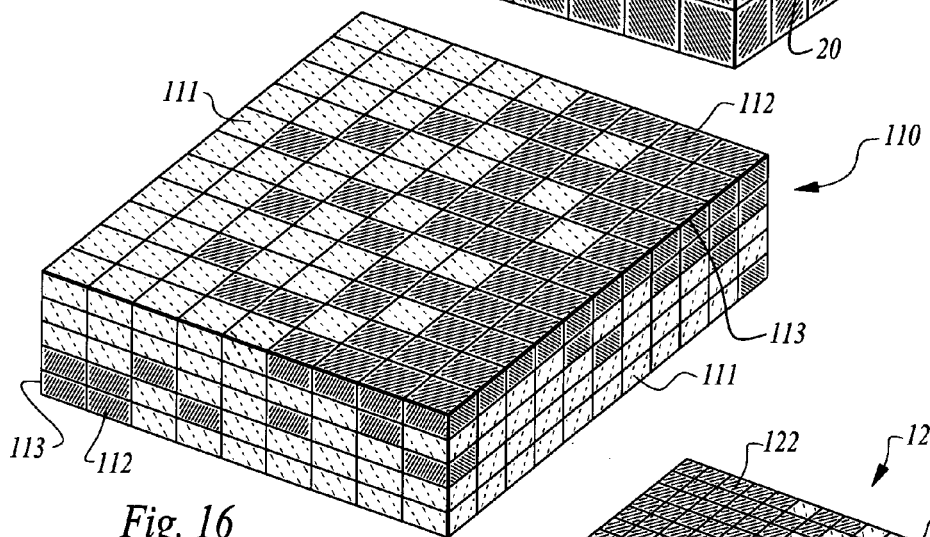
FIG. 16 is a perspective view of a structure formed of two dissimilar materials where the dissimilar materials are concentrated within separate regions that are aligned other than along a layer or layers of the print-formed structure.

With reference to FIG. 16, expansion on the principles discussed above are illustrated. In particular, a print-formed structure 110 is shown formed of first micro-bricks 111 and second micro-bricks 112. Two separate regions 113 of second micro-bricks 112 are depicted in the structure 110 depicted in FIG. 16. One of these regions 113 is in a lower left portion of the structure 110. The other region 113 is depicted in the upper right edge and upper front portion of the structure 110. The structure 110 does not exhibit precise boundaries, but rather a somewhat randomized positioning of the first micro-bricks 111 and second micro-bricks 112. Also note that the regions and boundaries defining these regions are not necessarily aligned with the layers within the print-forming structure 110. Rather, the boundaries can extend in a manner non-parallel with the layers of the structure 10.

Figure 17:
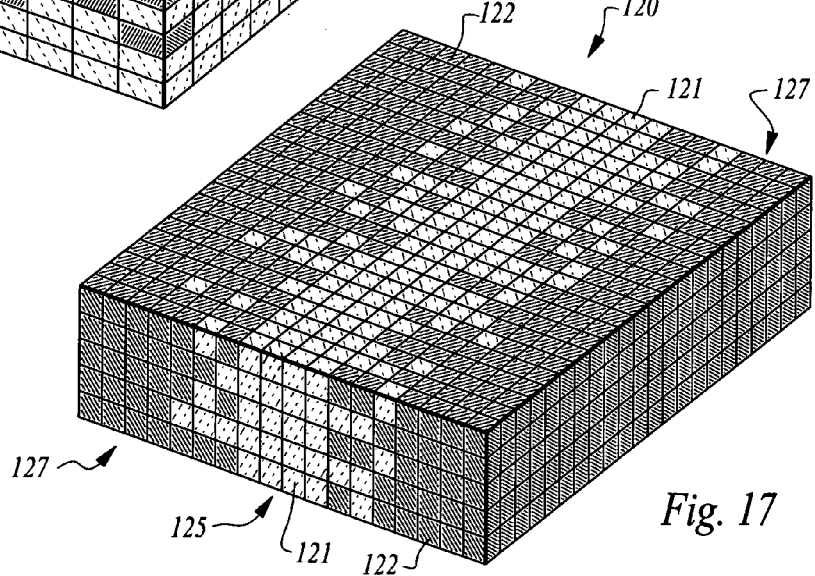
FIG. 17 is a perspective view similar to that which is shown in FIG. 16, but for a separate print-formed structure where a band of dissimilar material is interposed between other dissimilar materials with boundaries between the dissimilar materials oriented substantially perpendicular to layers of the print-formed structure.

In FIG. 17 a print-formed structure 120 is depicted which includes first micro-bricks 121 and second micro-bricks 122. These micro-bricks 121, 122 are arranged to include a center region 125 bounded on either side by side regions 127. The center region 125 is formed of first blocks 121 and the side regions 127 are formed of second blocks 122. Boundaries between the separate regions are randomized in the structure 120. Note that the boundaries run within vertical planes while the layers forming the print-forming structure are aligned horizontally. The structure 120 thus illustrates how the boundaries do not need to fall in the layers within the print-formed structure 120.

Figure 18:
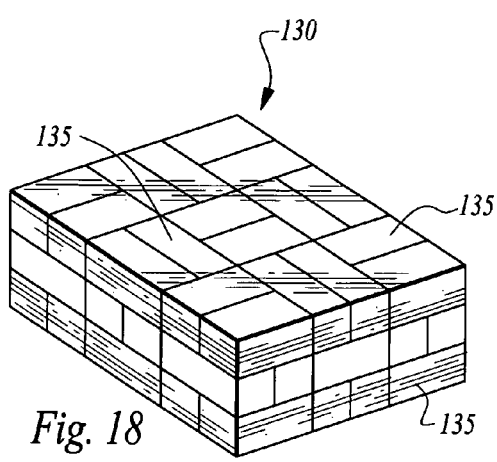
FIGS. 18-23 depict various different print-formed structures formed of micro-bricks of unspecified material having various different shapes. The individual micro-bricks can either be formed of common materials or different materials with each figure depicting various different patterns and shapes for the individual micro-bricks.
Figure 19:
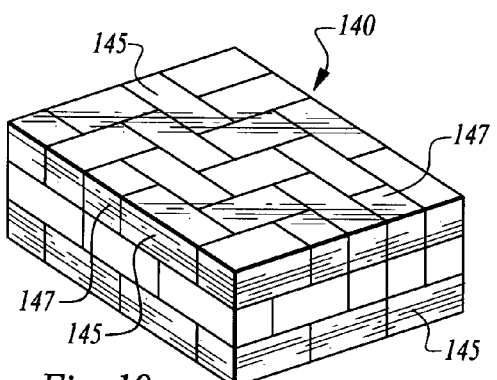
Figure 20:
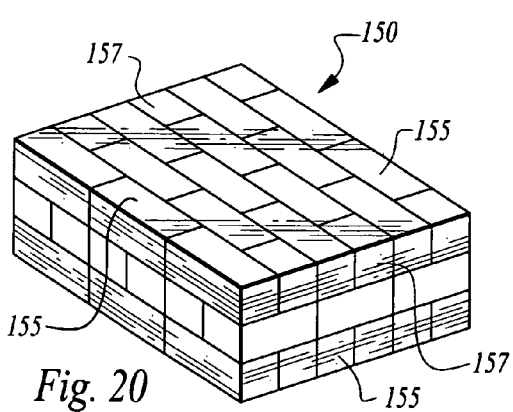

FIGS. 18-23 depict various different shapes for the micro-bricks which can be utilized according to this invention. These micro-bricks can be of either a first material or a second material (or a combination of both) within a print-formed structure. In FIG. 18 elongate rectangular micro-bricks 135 are depicted within a print-formed structure 130. These micro-bricks 135 are also arranged in a particular pattern shown in FIG. 18. FIG. 19 similarly shows rectangular micro-bricks 145 to form the print-formed structure 140 depicted in FIG. 19. A different pattern is represented by the rectangular micro-bricks 145. In this pattern some cube micro-bricks 147 are also required, such that micro-bricks of different sizes and shapes are combined together. FIG. 20 depicts a print-formed structure 150 formed of rectangular micro-bricks 155 and also cube micro-bricks 157 to provide the unique pattern depicted in FIG. 20. Note that these patterns can alternate between separate layers as depicted in FIGS. 18-20.

Figure 21:
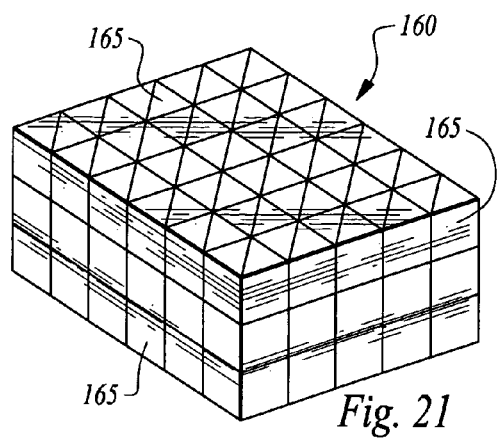

With reference to FIG. 21, a print-formed structure 160 is depicted which is formed of triangle micro-bricks 165. These triangle micro-bricks 165 illustrate how the edges of the micro-bricks 165 need not be orthogonal to each other.

Figure 22:
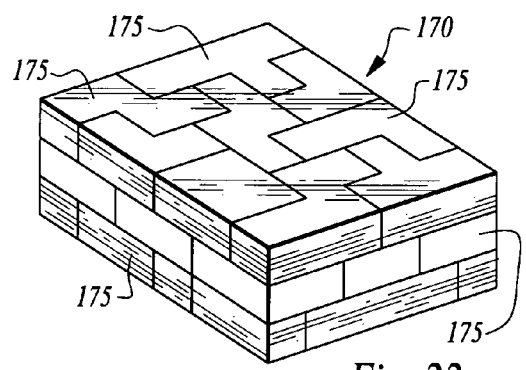

FIG. 22 depicts a print-formed structure 170 formed of geometric micro-bricks 175. These geometric micro-bricks 175 have a variety of different sizes and shapes which interlock to some extent together.

Figure 23:
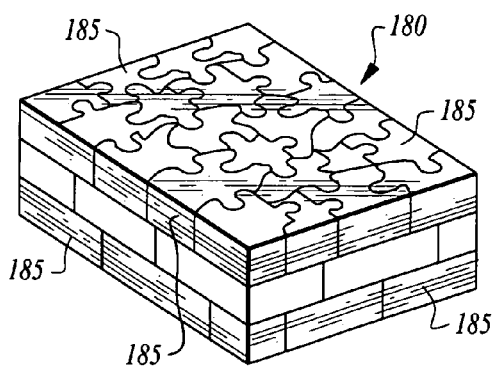

In FIG. 23 a print-formed structure 180 is depicted which includes jigsaw micro-bricks 185. These jigsaw micro-bricks 185 within the print-formed structure 180 depict how a fully interlocking structure can be provided and a highly evolved extension of the concept of shaping the micro-bricks 185 to have a geometry desired to provide the particular beneficial features of this invention. As with the embodiments of FIGS. 18-23, each layer can include similar or different micro-bricks, depending on the desires of the designer in designing the print-formed structure.

Figure 24:
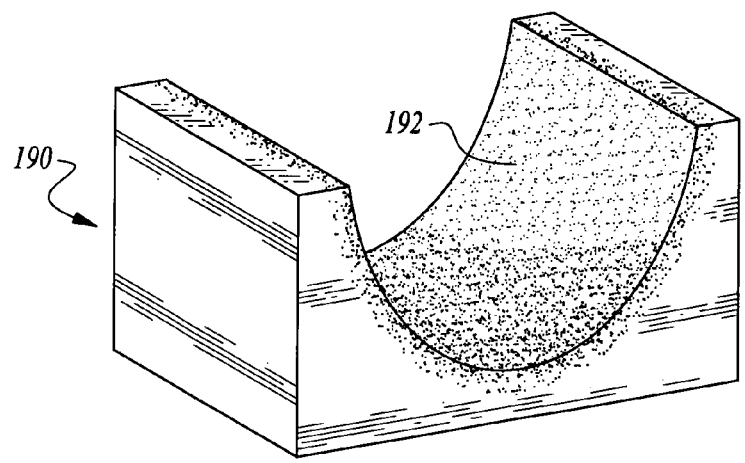
FIG. 24 depicts a structure having a curving surface and with concentrations of a first material concentrated on the curving surface of the structure.
Figure 25:
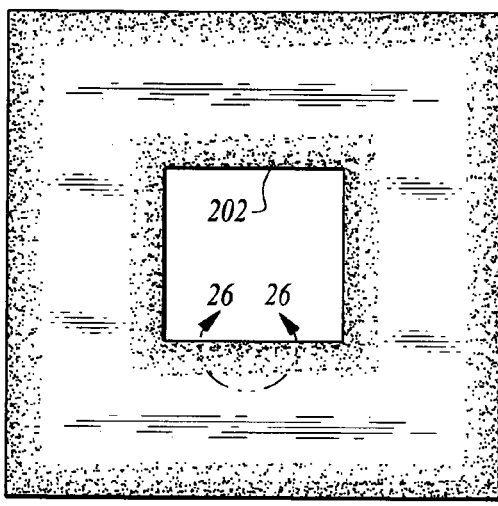
FIG. 25 is a elevation view of a structure having dissimilar materials concentrated in different ways on different surfaces of the structure.
Figure 26:
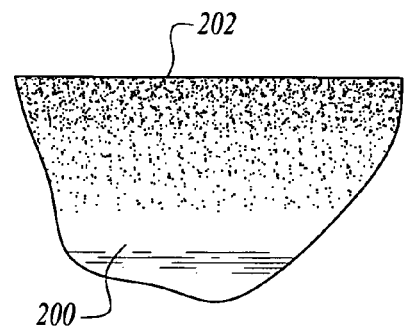
FIG. 26 is a detail of a portion of that which is shown in FIG. 25.

With particular reference to FIGS. 24-26, various additional print-formed structures are shown and further illustrate how the boundary configurations of this invention can be designed into real world structures. In FIG. 24 a trough print-formed structure 190 is depicted. This structure 190 includes a curving surface 192. The trough print-formed structure 190 is of a type which would benefit from having a curving surface 192 formed of a material different from other portions of the print-formed structure 190. If it is desirable to provide such a lining on the curving surface 192, utilizing the technique of this invention, an abrupt boundary is not required between the liner on the curving surface 192 and other portions of the structure 190. Rather, this boundary can be diffuse and randomized over a boundary region as described in detail above.

Typical benefits of such a liner would be that the liner would remain securely bonded to other portions of the structure and might not require other fasteners or bonding techniques because it would be somewhat interlocked with the other portions of the structure 190. Also, physical characteristics and differences in performance between the material forming the liner on the curving surface 192 and other portions of the structure 190 would not be concentrated along a surface boundary, but rather would be spread out over a boundary region for less stress concentration and otherwise improved performance.

FIG. 25 depicts another form of print-formed structure 200 which forms a circuit and has both an inside surface 202 and an outside surface 204. A detail of the inside surface 202 is depicted in FIG. 26. As with the trough structure 190, this structure 200 includes surfaces which are preferably and primarily of a material different than that forming other portions of the structure 200. By gradually transitioning to the material most prevalent at the surface 202, but not doing so in an abrupt fashion, the beneficial attributes of the material on the surface 202 can be provided without negative attributes associated with a sharp boundary between dissimilar materials.

Figure 27:
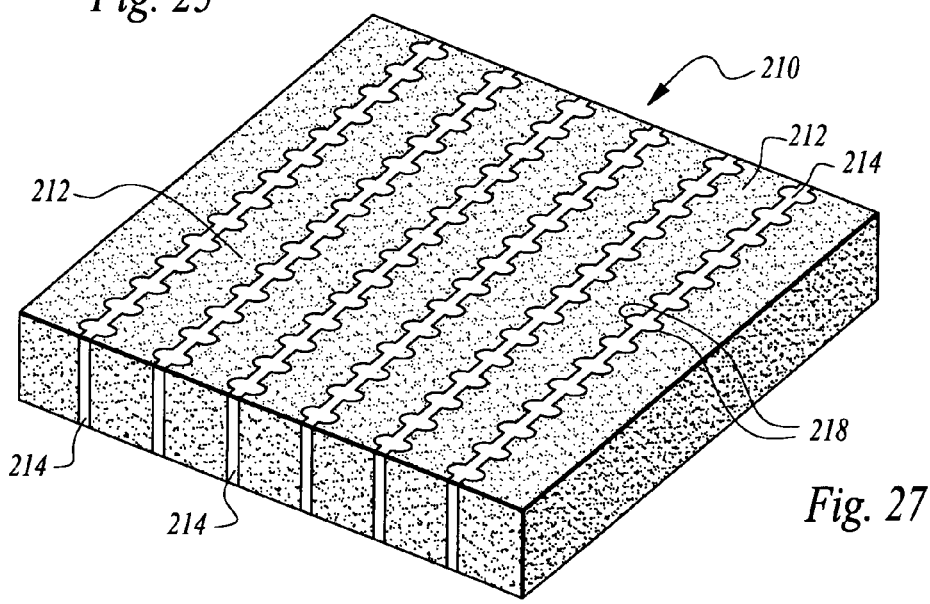
FIG. 27 is a perspective view of a structure with two dissimilar materials formed together and with some of the materials concentrated along specific regions to provide a design benefit to the structure such as reinforcement in a manner similar to reinforcing bars in concrete or carbon fibers in golf clubs.
Figure 28:
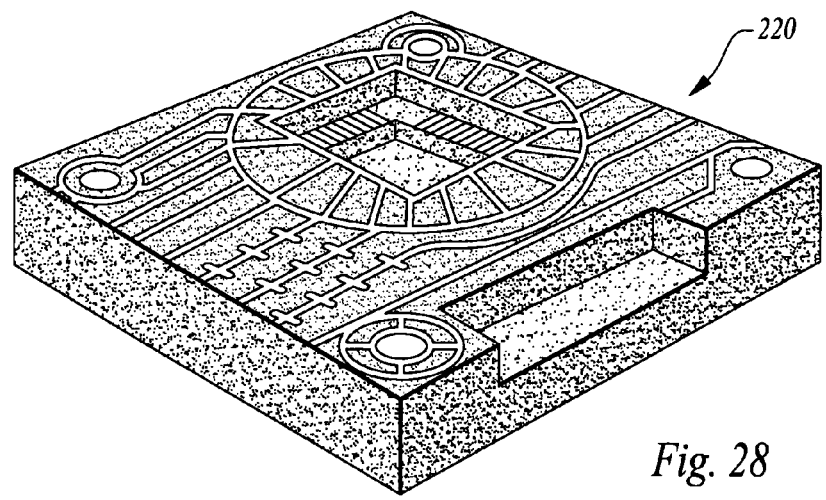
FIG. 28 is a perspective view of a complex structure illustrating how the two materials can be separated from each other and form a variety of different regions of either structural or other desired characteristics.

With reference to FIG. 27, a reinforced print-formed structure 210 is described. This structure 210 includes a first material 212 and a second material 214, with the second material 214 formed into spines within the first material 212. Such a structure 210 can be provided by a series of the micro-bricks of different materials placed where desired to form either the spine 214 or materials outside of the spine 214. Lobes 218 can be provided on the spines 214. With such a structure 210, second materials 214 can be provided as a reinforcing material to add structural strength to the first material 212, without requiring an excessive amount of the second material 214, and preserving performance for the overall structure 210 primarily based on performance of the first material 212. While these spines 214 are shown running horizontally, they could run vertically or horizontally (or both) in multiple directions to form a structural lattice internally within the print-formed structure 210.

Figure 29:
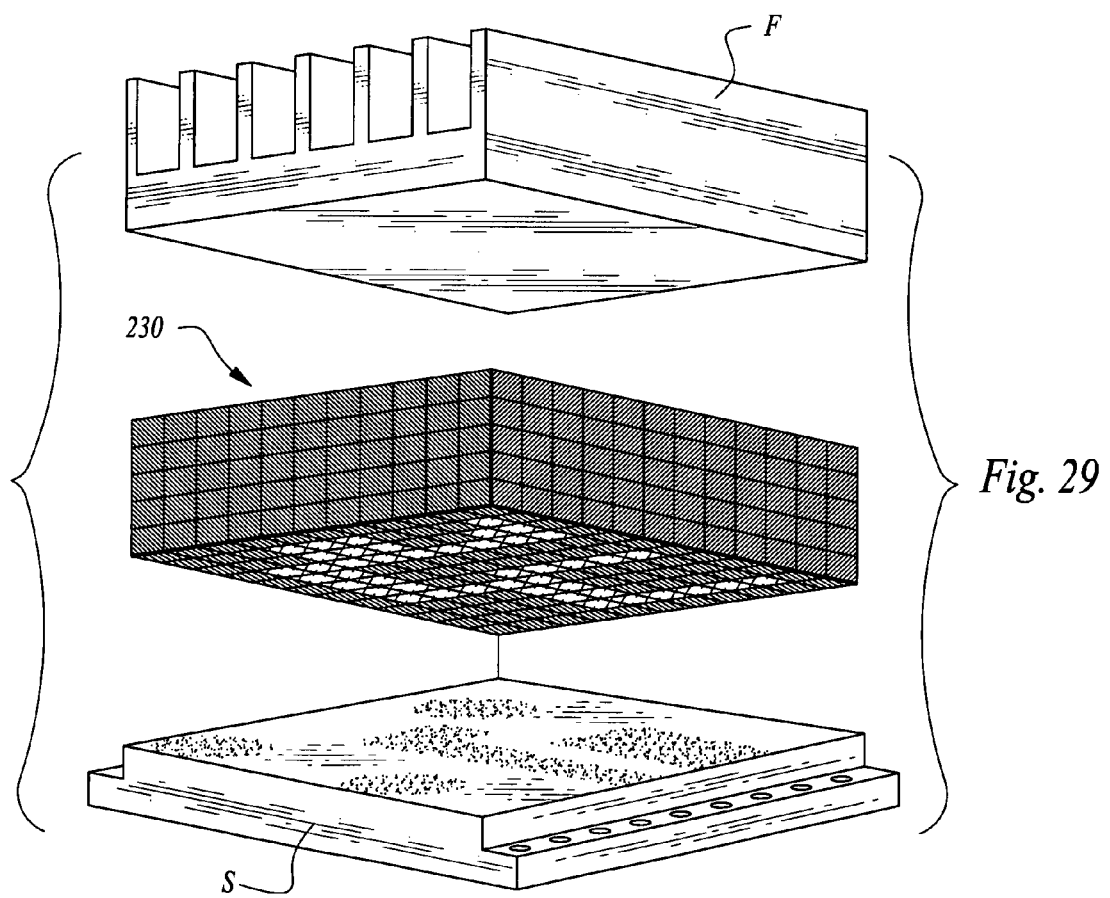
FIG. 29 is an exploded parts view of a heat exchanger fin structure above a structure formed according to this invention and adapted to be placed between the heat exchanger and a heat source, such as an integrated circuit, and illustrating how a structure formed according to this invention can have regions of differing characteristics, such as coefficients of heat transfer concentrated where desired for most optimal transfer of heat from a heat source to a heat exchanger.

With reference to FIG. 29, a combined structure 220 is provided of a print-formed variety and which has a combination of a variety of different structures formed of first and second materials. This part further depicts how a designer can specifically select which materials to place throughout a three dimensional structure precisely where desired to provide the performance characteristics desired.

With particular reference to FIG. 20, details of a heat exchanger print-formed structure 230 are described. As depicted, a finned heat exchanger F is not placed directly upon a heat source S, such as a microchip, but instead a heat exchanger print-formed structure 230 is interposed between the finned heat exchanger F and the heat source S. The heat exchanger print-formed structure 230 can have a mixture of insulating micro-bricks around a perimeter and heat conducting micro-bricks within an interior portion. The insulating material can prevent heat transfer to adjacent structures which might be sensitive to heat transfer, while transmitting heat efficiently through interior portions.

As one alternative, the most effective heat transfer materials could be concentrated over regions on the heat source S having the greatest heat production rate, so that optimal performance for the microchip or other heat source S can be maintained by efficiently removing heat from such a heat source. While heat transfer heat characteristics are optimized by a structure such as the heat exchanger print-formed structure 230, other characteristics such as electrical conductivity and other material properties could be optimized and customized by the placement of different materials precisely where desired as micro-bricks within a print-formed structure as described herein.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for designing an engineered boundary between regions of dissimilar materials within a print-formed structure, the method including the steps of:
   identifying a boundary between at least two materials including a first material and a second material, the boundary including a distribution of said first material approaching the boundary and passing the boundary from a first material side, and a distribution of the second material approaching the boundary and passing the boundary from a second material side, the first material side having more of the first material than the second material and the second material side having more of the second material than the first material;

putting at least a portion of the first material on the second material side of the boundary and at least a portion of the second material on the first material side of the boundary; and wherein portions of the first material on the second material side of the boundary are distributed randomly adjacent to the boundary and portions of the second material on the first material side of the boundary are distributed randomly adjacent to the boundary.

2. The method of claim 1 including the further step of continuing said putting step for every material in the print-formed structure to create custom designed boundaries at all interfaces between dissimilar materials within the print-formed structure.

3. The method of claim 1 including the further steps of:
providing the materials in micro-bricks of materials having a formulation and/or recipe specified by a designer of the print-formed structure; and
wherein said putting step includes the step of placing at least one first material micro-brick on the second material side of the boundary and at least one second material micro-brick on the first material side of the boundary.

4. A method for designing an engineered boundary between regions of dissimilar materials within a print-formed structure, the method including the steps of:
identifying a boundary between at least two materials including a first material and a second material, the boundary including a distribution of said first material approaching the boundary and passing the boundary from a first material side, and a distribution of the second material approaching the boundary and passing the boundary from a second material side, the first material side having more of the first material than the second material and the second material side having more of the second material than the first material;
putting at least a portion of the first material on the second material side of the boundary and at least a portion of the second material on the first material side of the boundary;
providing the materials in micro-bricks of materials having a formulation and/or recipe specified by a designer of the print-formed structure;
wherein said putting step includes the step of placing at least one first material micro-brick on the second material side of the boundary and at least one second material micro-brick on the first material side of the boundary; and
wherein the micro-bricks of said providing step are of substantially the same size and shape.

5. The method of claim 4 including the further step of placing the micro-bricks in a uniform pattern.

6. The method of claim 3 wherein said providing step includes shaping each of the micro-bricks to a specific geometry to achieve a design purpose.

7. A method for designing an engineered boundary between regions of dissimilar materials within a print-formed structure, the method including the steps of:
identifying a boundary between at least two materials including a first material and a second material, the boundary including a distribution of said first material approaching the boundary and passing the boundary from a first material side, and a distribution of the second material approaching the boundary and passing the boundary from a second material side, the first material side having more of the first material than the second material and the second material side having more of the second material than the first material;
putting at least a portion of the first material on the second material side of the boundary and at least a portion of the second material on the first material side of the boundary;
providing the materials in micro-bricks of materials having a formulation and/or recipe specified by a designer of the print-formed structure;
wherein said putting step includes the step of placing at least one first material micro-brick on the second material side of the boundary and at least one second material micro-brick on the first material side of the boundary;
wherein said providing step includes shaping each of the micro-bricks to a specific geometry to achieve a design purpose; and
wherein said shaping step includes shaping the micro-bricks to exhibit a geometry taken from the group of geometries including prisms, pyramids, cubes, cones, and truncated cones.

8. The method of claim 7 wherein said shaping step includes shaping the micro-bricks to be combinations of 2-dimensional shapes on surfaces and 3-dimensional shapes for volumes, with the micro-brick geometry transitioning from one shape on one surface or volume to another shape on another surface or volume.

9. The method of claim 6 wherein the materials utilized have different coefficients of thermal expansion.

10. The method of claim 6 wherein the first material and the second material of said identifying step have differing moduli of elasticity.

11. The method of claim 1 including the further step of arranging portions of the first material located on the second material side of the boundary to exhibit a concentration where a percentage of the first material on the second side of the boundary increases as the boundary is approached.

12. The method of claim 11 wherein the concentration changes as the boundary is crossed.

13. A method for designing an engineered boundary between regions of dissimilar materials within a print-formed structure, the method including the steps of:
identifying a boundary between at least two materials including a first material and a second material, the boundary including a distribution of said first material approaching the boundary and passing the boundary from a first material side, and a distribution of the second material approaching the boundary and passing the boundary from a second material side, the first material side having more of the first material than the second material and the second material side having more of the second material than the first material; and
putting at least a portion of the first material on the second material side of the boundary and at least a portion of the second material on the first material side of the boundary; and
confining portions of the first material on the second material side of the boundary to a boundary region adjacent to the boundary and confining portions of the second material on the first material side of the boundary within the boundary region adjacent to the boundary.

14. A method for designing an engineered boundary between regions of dissimilar materials within a print-formed structure, the method including the steps of:
identifying a boundary between at least two materials including a first material and a second material, the boundary including a distribution of said first material approaching the boundary and passing the boundary from a first material side, and a distribution of the second material approaching the boundary and passing the boundary from a second material side, the first material side having more of the first material than the second material and the second material side having more of the second material than the first material; and putting at least a portion of the first material on the second material side of the boundary and at least a portion of the second material on the first material side of the boundary; and wherein said boundary is in the form of an interlocking boundary of non-planar form.

15. The method of claim 1 wherein the boundary of said identifying step is substantially aligned with at least one layer of the print-formed structure.

16. The method of claim 1 wherein the boundary of said identifying step is non-aligned with layers of the print-formed structure.

* * * * *